United States Patent [19]

Nagin, Jr. et al.

[11] 4,037,744

[45] July 26, 1977

[54] LIFT TRUCK PUSHER DEVICE

[76] Inventors: Tony Nagin, Jr.; Tony Nagin, Sr., both of 2023 Lioncrest Drive, Richton Park, Ill. 60473

[21] Appl. No.: 684,889

[22] Filed: May 10, 1976

[51] Int. Cl.² .......... B60P 1/02

[52] U.S. Cl. .......... 214/514; 214/82

[58] Field of Search .......... 214/514, 510, 730, 82, 214/731

[56] References Cited

U.S. PATENT DOCUMENTS

| | | | |
|---|---|---|---|
| 2,601,932 | 7/1952 | Turner | 214/514 |
| 2,639,051 | 5/1953 | Thomas | 214/514 |
| 2,785,818 | 3/1957 | Mercier et al. | 214/514 |
| 2,993,610 | 7/1961 | Kughler | 214/730 |
| 3,021,024 | 2/1962 | Nagin | 214/514 |

*Primary Examiner*—Albert J. Makay
*Assistant Examiner*—Lawrence E. Williams
*Attorney, Agent, or Firm*—Hill, Gross, Simpson, Van Santen, Steadman, Chiara & Simpson

[57] ABSTRACT

A pusher device for lift trucks and the like, particularly for sheet-supported loads, in which movement of a pusher structure is effected by a plurality of pusher chains, so constructed that they are rigid when extended in substantially a straight line to compression forces acting along such line but capable of being flexed, in which the free ends of the pusher chains are relatively fixedly disposed and the opposite ends extendable from and retractable towards the movable pusher structure, with the latter carrying the power source for effecting such extension and retraction of the chains. Novel means are also provided for maintaining the chains in desired positions, as well as novel gripping means which facilitates the engagement of the pusher structure with sheet-supported loads and the like.

15 Claims, 7 Drawing Figures

FIG. 5
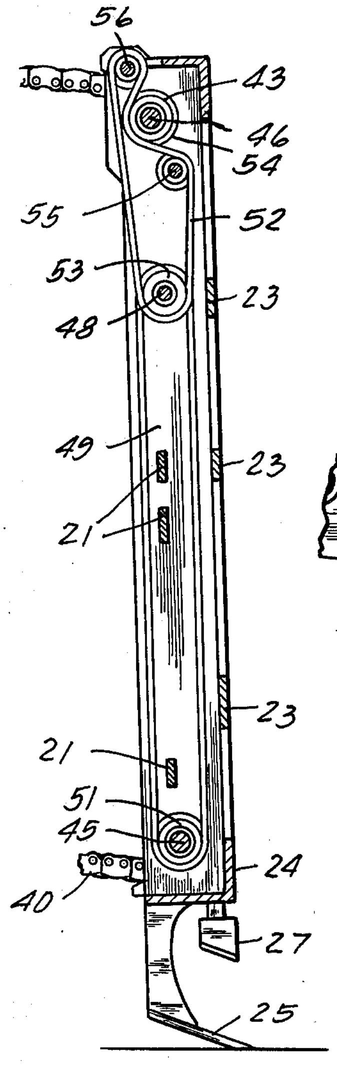
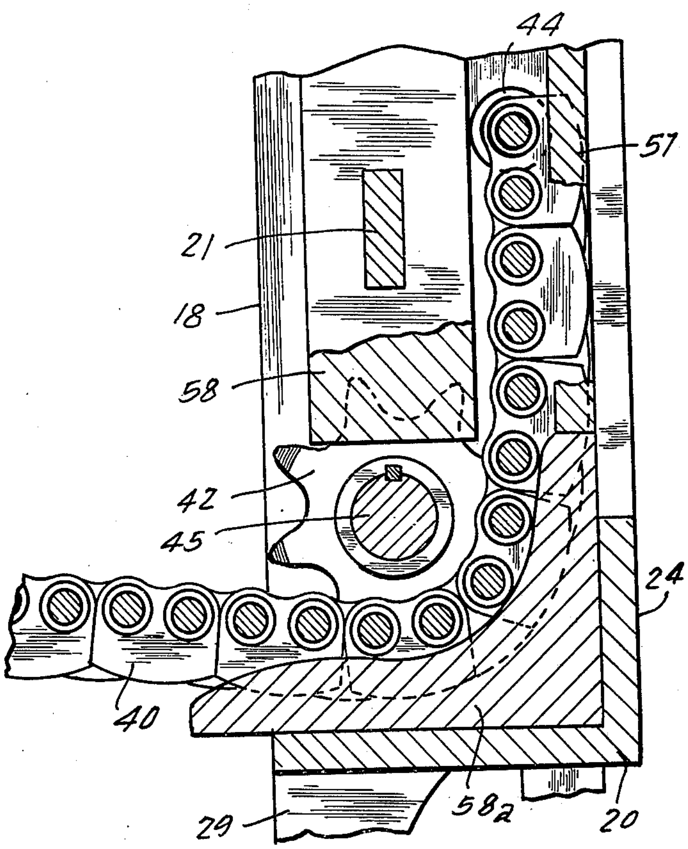
FIG. 6
FIG. 7
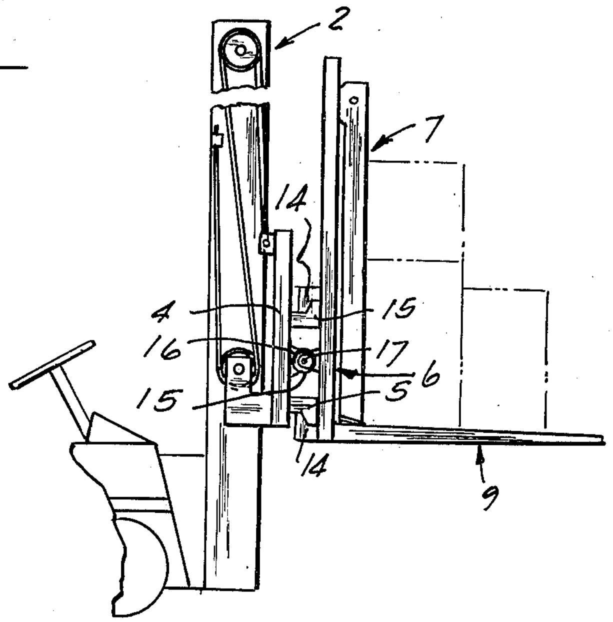

LIFT TRUCK PUSHER DEVICE

BACKGROUND OF THE INVENTION

Pusher mechanisms for fork-lift trucks and the like have been utilized for many years and the use of chain structures for actuating such a pusher mechanism likewise have been known.

Prior Nagin Pat. No. 3,021,024, issued on Feb. 13, 1962 illustrates a chain actuated pusher structure.

Pusher structures of this type, including that of such prior patent, have all employed a generally common type of overall structure, in which a base structure is carried by the lift truck carries the power source for actuating the pusher structure as well as the drive means therefor, with the actual pusher structure being relatively lightly constructed, consistent with its pushing function, and primarily comprising a unitary structure which is movable toward and away from the base structure. Thus, in the prior patent above referred to, the base structure carried the actuating means, i.e. sprockets for the respective chain elements the power source for driving such elements, the storage means for the adiacent ends of the chains when the pusher structure is in a retracted position etc., whereby all of the actuating structure with the exception of the connecting portions of the chains between the base structure and the pusher structure were disposed on and carried by the base structure. The pusher structure in such case merely provided an adequate pushing base adapted to engage the object being moved, with the only other items being the connection means for the adjacent free ends of the actuating chains.

More recently the use of pusher structure in connection with loads supported on sheet material, rather than pallets and the like, have been more extensively utilized. In this case the load, which may comprise several objects, is supported on a sheet of heavy board stock or other material capable of supporting the load with the pusher structure being provided with a gripper structure whereby the edge of the load-supporting sheet may be firmly gripped, and, by means of retracting movement of the pusher structure, drawn upon the platen or tines of the pusher device. When such a load is to be removed from the pusher device it is merely pushed off of the same by means of the pusher structure, the gripper, in such case, not actually being required.

It will be apparent that with such "slip-sheeted" loads the pusher device must be provided with a suitable gripper structure to enable the sheet carrying the load to be gripped and then moved onto the platen structure of the mechanism. Consequently, the pusher structure must be provided with such a gripper structure as well as the actuating means therefor, for example a hydraulic cylinder. As a result of the required construction, pusher devices including sheet-grippers have involved a relatively thick or heavy base structure, adequate to contain all the actuating mechanism for the pusher structure, while the latter likewise has been of relatively heavy construction, as it now is required to also carry the gripper mechanism including the actuating cylinder or other actuating means therefor. Consequently, such base and pusher structures required and occupied a relatively large minimum amount of space in fore and aft direction, i.e. when the pusher member was in its fully retracted position, which in many cases was 7 inches or more. It will be appreciated that as all of this structure is carried by the lift truck ahead of the front wheels thereof and with the load to be supported thereby disposed ahead of the pusher mechanism, any increase or undesired thickness in such direction of the pusher device as well as increase or excessive weight in the pusher structure results in a corresponding reduction in the total load capacity of the lift truck, as the entire load must be countered by the weight of the truck, and in particular with respect to its center of gravity relative to the front axle thereof, i.e. at the opposite side thereof to the load being carried thereby.

BRIEF SUMMARY OF THE INVENTION

The present invention has as its primary objective the elimination of the disadvantages in prior pusher devices whereby the overall fore and aft thickness of the pusher device is reduced to substantially a bare minimum, with a material reduction in the overall weight of the pusher structure, to correspondingly increase the net load capacity.

In addition, the present invention provides a novel improved gripper structure and an automatic adjustment of the pushing member with respect to the load supporting platen to facilitate the removal of a load without damage thereto by the pushing member.

The desired results are achieved in the present invention by the elimination of the heavy base structure normally carrying the actuating mechanism, and replacing it by a base structure which is at a bare minimum both with respect to size and weight, with the base structure merely providing the means of attachment of the pusher device to the lift truck, and containing one of the actuating mechanism for the pusher structure. Instead, the actuating mechanism for the pusher structure is carried thereby, as well as the gripper structure and actuating means therefore, with the fore and aft thickness of the pusher structure being little, if any, greater than the corresponding thickness required in previous devices of this general type for slip-sheeted loads. As a result, the overall thickness of the total pusher device can be reduced from 7 inches or more to approximately 4 inches, or almost half.

Thus, in the present invention, employing pusher chains of the type heretofore referred to, the pusher structure carries the chain driving sprockets, provides the storage space for the free ends of the chain, as well as the gripper mechanism and its actuating means, while the base structure merely supports the load-carrying platen and provides anchor means for the free ends of the chains and the operative connection thereof to the lift truck.

The construction is such that it also may be readily designed to provide a side-shift function without any additional increase in the effective overall bulk.

In a further feature of the invention, the pusher structure is supported solely by the load carrying platen, with the pusher chains merely determining the position of the pusher structure, whereby the latter may be moved partially off of the free end of the platen to effectively lower the gripper structure for easy engagement with a load-supporting sheet, and is so constructed that the operator may readily view the action of the gripper structure.

In another feature of the invention, the chain actuating mechanism is so designed that the chain travel may be so varied that the pusher structure is automatically maintained at the most effective angle for possible engagement with the load being carried, particularly when the latter is being pushed off of the platen.

BRIEF DESCRIPTION OF THE DRAWINGS

In the drawings wherein like reference characters indicate like or corresponding parts:

FIG. 5 is a vertical sectional view taken approximately on the line V—V of FIG. 3, illustrating the chain drive connections;

FIG. 6 is a sectional view taken approximately on the line VI—VI of FIG. 3; and FIG. 7 is a side elevational view of a pusher device and lift structure of a lift truck, also illustrating the manner in which the pusher device may be mounted to provide a side-shift operation.

DETAILED DESCRIPTION OF THE INVENTION

Figure 1:
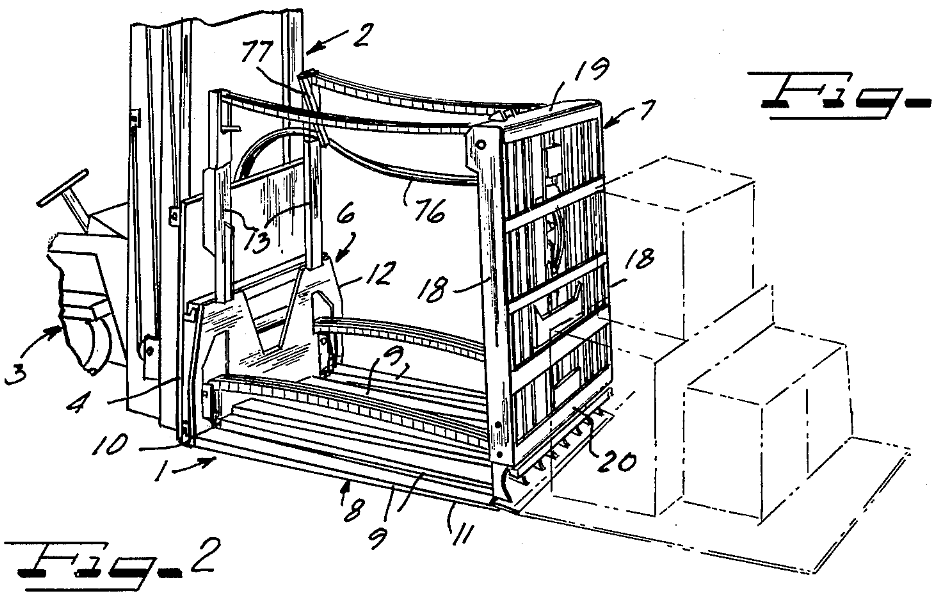
FIG. 1 is a perspective view of a pusher device constructed in accordance with the present invention, illustrating the mounting thereof on a lift truck.

Referring to the drawings and more particularly to FIGS. 1 and 7, the reference numeral 1 indicates generally a pusher device constructed in accordance with the present invention and adapted to be mounted on the lift-structure 2 of a lift-truck 3 only the front portion of which is illustrated. The lift-structure 2 includes a vertically movable carriage 4, for example a standard ITA carriage having standard L-shaped lugs or clamps 5 which form the mounting means for the pusher device 1.

The pusher device 1 comprises three main components, a base structure, indicated generally by reference numeral 6, a movable pusher structure, indicated generally by reference 7, and a platen structure 8, illustrated as comprising a plurality of members 9, each of which is of tapering cross-section having a relatively large end 10, and a relatively thin end 11, with the large ends 10 thereof being rigidly welded or otherwise secured to a plate member 12 forming a part of the base structure 6. The latter also includes a pair of spaced uprights 13 extending upwardly from the plate 12 and welded or otherwise rigidly connected thereto.

The base structure 6 is operatively connected to the lift-member or carriage 4 of the lift truck, by suitable means as for example, oppositely disposed lugs or clamps 14 adapted to mate with the lugs 5 on the carriage 4. The lugs 14 may be readily rigidly secured to the lugs 5 whereby the base structure is fixedly connected to the carriage 4, or the lugs 5 and 14 may be in the form of elongated guide members adapted to slidably carry the base structure 6, whereby the latter may be laterally shifted relative to the carriage 4, thus providing a side-shift arrangement. Such a shifting may be readily effected by suitable means as for example a hydraulic cylinder 15, rigidly connected at one end to the carriage 4, for example by means of a bracket 16 and having its actuating or piston rod connected to a bracket 17 mounted on the plate 12 of the base structure 6. By so arranging the parts that the pusher device is centered, with respect to the carriage 4, when the piston of the cylinder 15 is at the midpoint of its travel, suitable lateral adjustment of the pusher device and be achieved in either side direction. The mounting and adjustment of the pusher device with respect to the lift-member of the lift truck may employ any suitable construction, and the specific details thereof form no part of the present invention.

Figure 2:
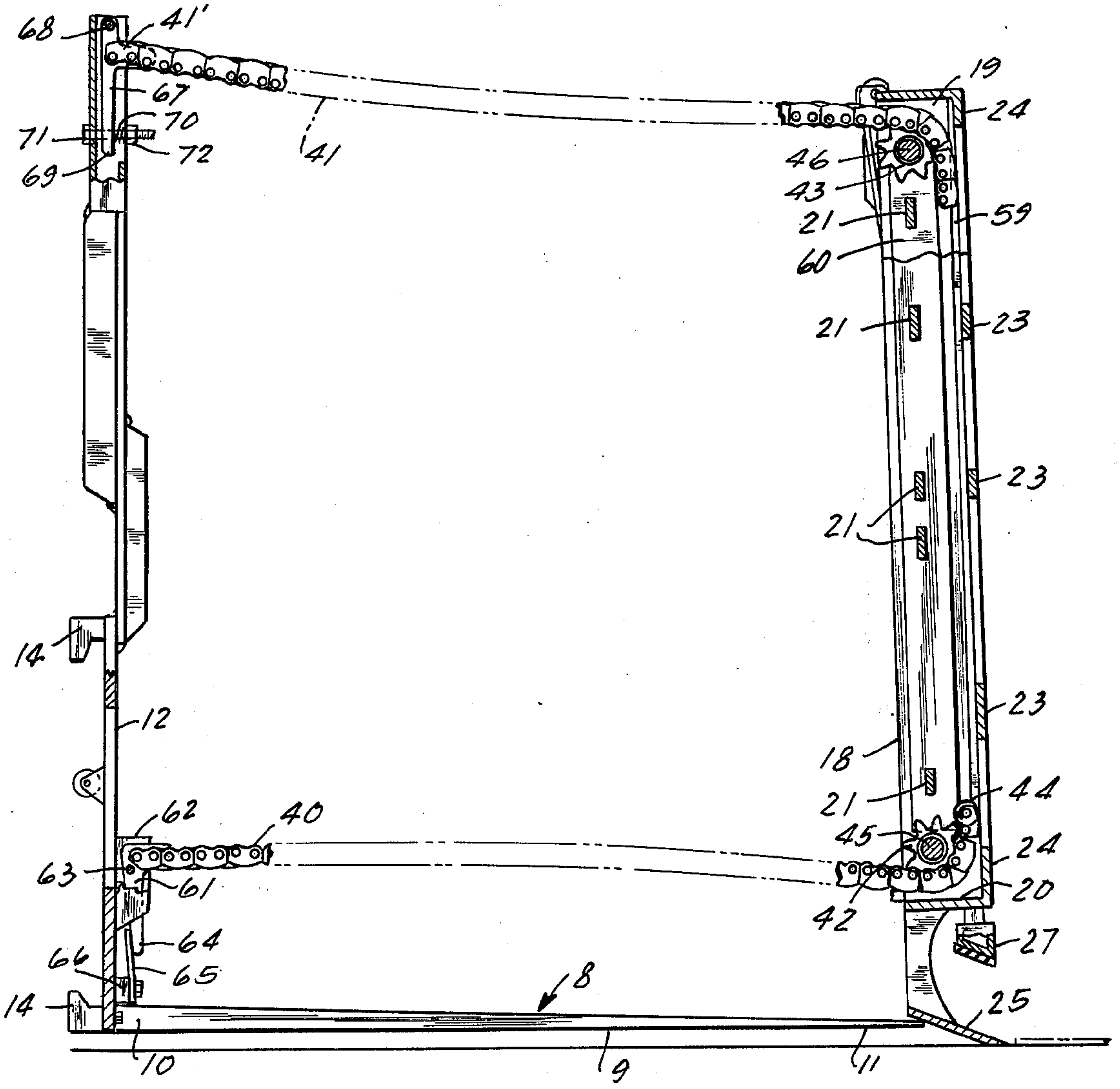
FIG. 2 is a side elevation of the pusher device with portions of the latter broken away to disclose the details thereof.
Figure 3:
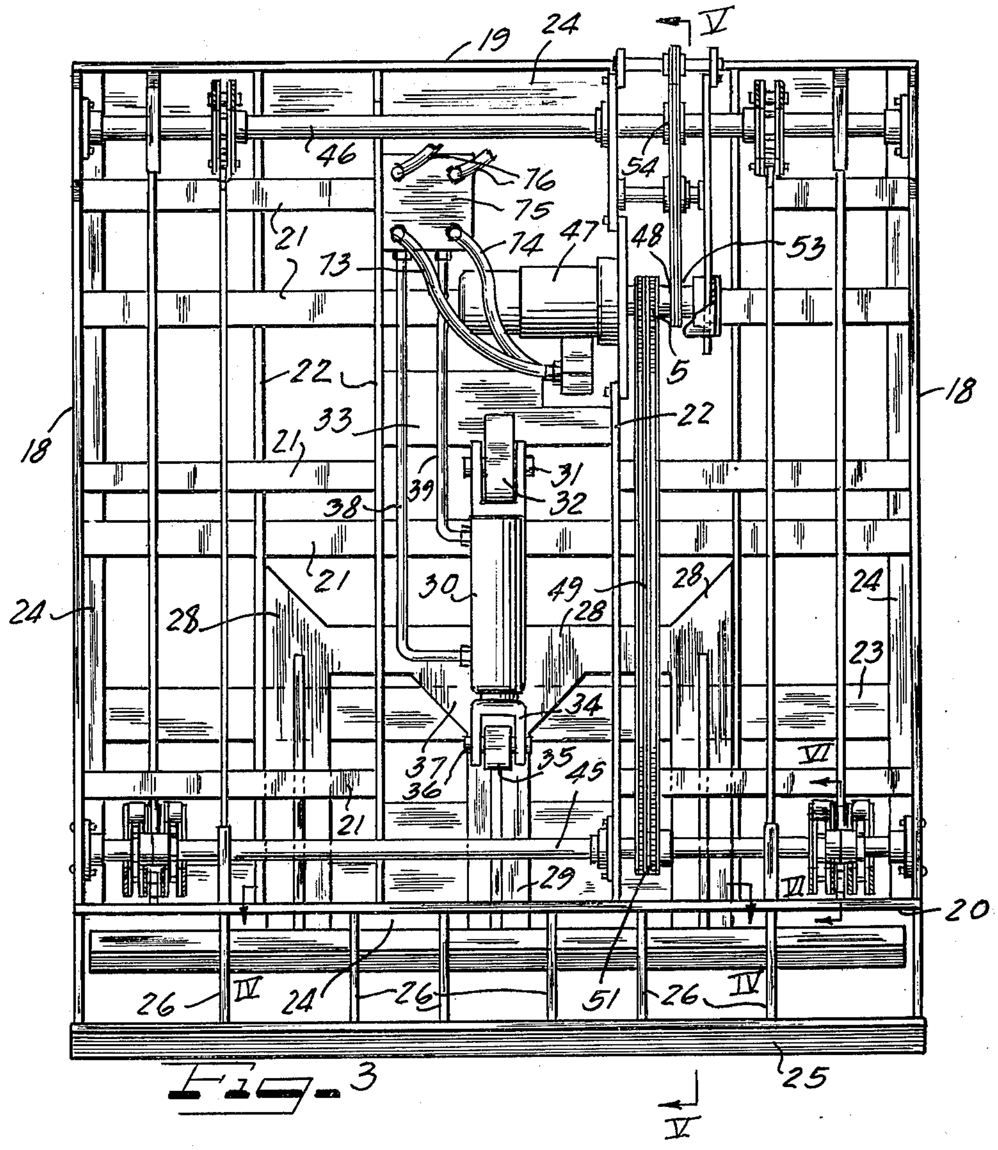
FIG. 3 is a rear elevational view of the pusher structure.
Figure 4:
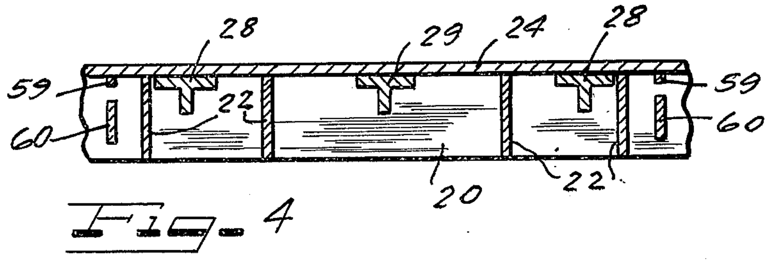
FIG. 4 is a sectional view taken approximately on the lin 4—4 of FIG. 3.

The pusher structure 7, as illustrated in FIGS. 2 and 3, is of generally rectangular configuration including respective side members 18, a top member 19 and a bottom member 20, all of which preferably are angle members welded together at their ends to form a rectangular structure and connected by a plurality of members, for example, horizontally extending cross-members 21 and vertical members 22. The front or pusher face of the pusher structure 7 is defined by a plurality of cross-members 23 and the respective legs or flanges 24 of the top and bottom members 19 and 20 with the members 23 and flanges 24 being disposed in a common plane which defines such pushing face. It will be appreciated that in view of the open, lattice-type design of the pusher structure, the latter while possessing adequate rigidity for the desired pushing operations, is of relatively very light weight.

Disposed below the lower member 20, and spaced therefrom is a gripper plate 25 which is rigidly connected to the member 20 by a plurality of vertically extending members 26 of plate-like configuration, rigidly welded at their top and bottm ends to the member 20 and plate 25 respectively. Extending laterally across and above the plate 25 is a cooperable gripper bar 27 having a plurality of vertically extending guide members 28 and 29 rigidly connected at their lower ends to the bar 27 and at their upper ends to a cross member 28, with the members 28 and 29 being slidable in complementary openings in the lower cross member 20, whereby the bar 27 may be moved thereby towards and away from the gripper plate 20. Vertical movement of the gripper bar 27 may be effected by suitable means such as hydraulic cylinder 30 having its upper end pivotally supported by means of a bolt 31 which extends through a bar 32 rigidly carried by a cross-member 33 of the pusher structure, while the piston rod of the cylinder 30 terminates at its lower end in a clevis 34 which is pivotally connected to a block 35 by a bolt 36 with the block 35 being suitably rigidly secured to the center upright 29 and cross-member 28 which are connected by a triangular plate 37. Hydraulic fluid may be supplied to the opposite ends of the cylinder 30 by respective lines 38 and 39.

As illustrated in FIGS. 1 and 2, the pusher structure 7 is adapted to be vertically supported by engagement of the gripper plate 20 with the upper surface of the platen 8, and is retained in generally vertical position by a lower pair and an upper pair of chains, the lower pair comprising spaced chains 40 and the upper pair comprising spaced chains 41. The ends of the chains 40 and 41 are suitably attached, as hereinafter described, to the base structure 6 while the outer ends of the chains are adapted to be carried around respective sprockets 42 and 43 rotatably supported in the pusher structure. As illustrated in FIG. 3, the upper chains 41 are of a single link construction with each of the sprockets 43 likewise being in the form of a single sprocket whereas the chains 40 are of triple-link construction and adapted to engage the dual sprocket 42 having spaced toothed discs each engaging an outer section of the triple-link chain. The free ends of the chains 40 may be provided with enlarged end rollers 44 which function as limit stops which prevent the chain from being moved completely out of disengagement with the associated sprocket, and thus function to determine the limit of outward travel of the pusher structure. The sprockets 41 are rigidly carried by a lower driven shaft 45, while the upper sprockets 43 are rigidly carried by an upper driven shaft 46, with both shafts being driven by a suitable power source as for example a hydraulic motor 47 having a drive shaft 48.

As illustrated in FIG. 5, the motor drive shaft 48 is operatively connected with the lower driven shaft 45 by a double-link chain 49 which is meshed with a dual sprocket 50 on the drive shaft 48 and a similar sprocket 51 on the shaft 45. The drive shaft 48 is operatively connected with the upper driven shaft 46 by a chain 52 which may be of single-link construction and is driven from the shaft 48 through a sprocket 53 and, in turn, drives the shaft 46 by means of a sprocket 54, with the chain also passing over two idler sprockets 55 and 56, whereby the shaft 46 is rotated in a direction opposite to that of the shaft 45. As a result of this construction, the motor 47 will drive the shafts 45 and 46 in directions that will either simultaneously retract the chains 40 and 41 into the pusher structure or simultaneously extend them therefrom.

As will be illustrated in FIGS. 2, 3 and 6, the pusher structure includes suitable guide members, such as the members 57 and 58 for the chains 40 and similar guide members 59 and 60 for the chains 58, operative to guide the respective free ends of the chains in a vertical plane when said chains are fully retracted into the pusher structure. Likewise, guide blocks **58*a* may be provided adjacent the sprocket 42 and if desired also adjacent the sprockets 43. All of the guide members 57, 58 and 58*a* would be disposed in line with the middle links of the triple-link chain 40**.

As previously mentioned, and as will be apparent from a reference to FIG. 6, the chains 40 and 41 have the links thereof so designed that when the chain is extended in substantially a straight line it will be rigid with respect to compression forces acting along such line, but at the same time the chain is free to flex, in one direction, out of such line, for example around the sprocket 42 in FIG. 6. Chains of this type are known and no need is seen to go into detail with respect to the construction of such chains. For example see prior Nagin U.S. Pat. No. 3,021,024 which discloses a chain of this general type.

In order to maintain the rigidity of the chains under compression loads, it is desirable to provide that the chains, when extended, in a line will be tensioned in a direction to insure the rigidity of the chain under compression loads, i.e. to prevent undesired flexing of the chain out of the desired line. It will be noted with respect to the lower chain 40 that the action of gravity tends to flex the chain out of such a line and it is therefore particularly desirable to provide additional means for insuring the desired tensioning of the chain.

This is accomplished in the embodiment of the invention illustrated, by rigidly connecting at least the end link 40' of the chain, preferably also the pivot pin of the next link, to a generally L-shaped arm 61, which is pivotally supported on the base plate 12 of the base structure 6 by a bracket or block 62 mounted on the plate 12 with the arm 61 being connected to the member 62 by a pin 63. The lower end 64 of the arm 61 is urged away from the plate 12 by a leaf spring 65, illustrated as being bolted to the plate 12 through a block 66 with the leaf-spring thus urging the link 40' of the chain in a direction to arch the chain 40 as illustrated in broken lines in FIG. 2. At the same time, it will be noted that as pivot pin 63 is below the pivotal connections of the respective links of the chain 40, compression forces on the chain will likewise have a vector which will tend to rotate the link 40' in the same direction as that imparted by the spring 65 to apply further force on the chain in the desired direction.

While the chains 41 are urged, by the action of gravity, into a direction opposing flexing of the chain, further means preferably is also provided to apply additional forces to the chain in such direction. Thus, as illustrated in FIG. 2, the end link 41' of each chain 41, and the adjacent pivot pin of the next link, is rigidly secured to a generally T-shaped arm 67 which is pivotally connected by a pin 68 to the adjacent upright 13 of the base structure 6, with the lower end 69 of the arm 67 being urged to the left as viewed in FIG. 2 by a compression spring 70 which is retained in position by a bolt 71 and nut 72. Thus, the compression spring 70 applies additional force to the chain 41 in a direction to oppose flexing thereof.

The hydraulic motor 48, having fluid supply lines 73 and 74, and cylinder 30 are adapted to be connected through their respective lines to a sequencing valve 75 which is adapted to be supplied with hydraulic fluid to supply lines 76 (FIG. 1) which are adapted to be guided, as the pusher structure as retracted, by an arm 77 which is pivotally supported by one of the uprights 13 and thus prevent undesired movement of the lines.

In use, the operation of the sequence valve 75 is such that normally the gripper bar 27 will be in elevated position, as illustrated in FIG. 2, and when it is desired to move the pusher structure, hydraulic pressure will initially be transmitted to the cylinder 30 whereby the gripper bar 27 is moved to its cooperable gripping position with respect to the gripper plate 25, and only after maximum pressure has built in the cylinder 30 will fluid be supplied to the motor 48 to extend or retract the pusher structure. Consequently, full gripping power will be produced before the pusher structure is retracted or extended.

It will also further be noted that as the pusher structure is guided merely the chains 40 and 41, with proper design, the pusher structure may be extended sufficiently to partially run off of the extreme end of the platen 9 permitting the pusher structure to drop to ground level, as illustrated in FIG. 2, eliminating any space between the front edge of the pusher plate and the ground, to greatly facilitate the insertion of the gripper plate below a slip sheet with which it is to be engaged. Likewise, it will be noted from a reference to FIG. 5 that the size of the sprocket 54 driving the upper chains may readily be varied slightly as to effective diameter, whereby the extension of the chains from the pusher structure may be suitably proportioned, with the upper chains being extended at a slightly slower rate than the lower chains, to permit the pusher structure to tilt backwardly very slightly as it reaches its extreme extended position, thereby completely eliminating any possibility of the front face of the pusher structure engaging the upper portion of a load and possibly damaging the same as such load is being pushed off the platen 9. It will be noted that this "tilt action" of the pusher structure is achieved automatically without any additional mechanism and without varying the basic construction.

It will be appreciated from the above description that, as the entire operating mechanism for the pusher device is contained within the movable pusher structure, it is possible to employ a very light base structure that occupies very little additional space over that occupied by the pusher structure in fore and aft direction, whereby the retracted pusher device is relatively very thin in such direction as compared with conventional type pusher devices. Likewise, the use of compression chains eliminates any bulky expanding structure disposed between the base and pusher structures, adding to the saving in space as compared with devices which employ intermediate cylinders etc.

Having thus described our invention it will be obvious that although various minor modifications might be suggested by those versed in the art, it should be understood that we wish to embody within the scope of the patent granted hereon all such modifications as reasonably, and properly come within the scope of our contribution to the art.

We claim as our invention:

1. In a pusher device for lift trucks and the like, particularly for sheet-supported loads, the combination of a relatively fixed, generally vertically extending base structure provided with means for mounting the same on a lift truck, a platen structure rigidly carried by and extending generally horizontally outward from said base structure at the side thereof remote from the mounted side thereof, a pusher structure supported by said platen structure and movable thereon toward and away from said base structure, a plurality of pusher chains extending between said base and pusher structures with the adjacent ends of the chains secured to said base structure, which chains are each constructed to be rigid, when extended in substantially a straight line, to compression forces acting thereon along such line but capable of being flexed in a direction traverse to such line, a sprocket for each chain, rotatably supported by said pusher structure, by means of which said chains may be extended from or retracted to the latter, means carried by said pusher structure for guiding the free ends of the chains during retracting movement thereof whereby such free ends may be stored, in substantially a common plane, on said pusher structure, a power source carried by said pusher structure, and means operatively connecting said power source and said sprockets for rotating the latter in directions to simultaneously extend said chains or retract the same with respect to said pusher structure, and thereby correspondingly move the pusher structure toward or away from the base structure.

2. A pusher device according to claim 1, comprising in further combination, a gripper plate disposed at the bottom of and extending in the same general transverse direction as said pusher structure, said gripper plate being spaced below a supporting member of said pusher structure and inclined with respect to the line of direction of the latter whereby its trailing edge is elevated relative to its leading edge, a gripper bar disposed below said member and movable toward and away from said gripper plate, for cooperation to grip sheet material disposed therebetween, means rigidly connecting said supporting member and plate, said gripper plate riding on said platen structure and supporting such pusher structure thereon, the latter having a travel such that a portion of said gripper plate may, at the extreme end of the extension travel of said pusher structure, extend beyond the free end of the plate to dispose the leading edge of said gripper plate below the adjacent free end of the platen.

3. A pusher device according to claim 2, wherein said connecting means for said gripper plate comprises a plurality of plate-like members connecting said supporting member and plate, with said plate-like members being disposed in spaced planes extending parallel to the travel direction of said pusher structure, whereby said gripper plate and supporting structure therefor does not materially restrict view of the gripper bar and gripper plate from the rear thereof.

4. A pusher device according to claim 1, comprising in further combination a gripper plate disposed at the bottom of and extending in the same general direction as said pusher structure, said gripper plate being spaced below a supporting member of said pusher structure and inclined with respect to the line of direction of the latter whereby its trailing edge is elevated relative to its leading edge, a gripper bar disposed below said member and movable toward and away from said gripper plate, for cooperation therewith to grip sheet material disposed therebetween, a plurality of plate-like members connecting said supporting member and plate, with said plate-like members being disposed in spaced planes extending parallel to the travel direction of said pusher member, whereby said gripper plate and supporting structure therefor does not materially restrict view of the gripper bar and gripper plate from the rear thereof.

5. A pusher device according to claim 1, comprising in further combination respective means engaged with each chain for tensioning the same in a direction transverse to its length and operative to apply forces to the intermediate portions of said chains opposing flexing thereof.

6. A pusher device according to claim 5, wherein the respective tensioning means operatively connect the end of the associated chain to said base structure, such means for each chain comprising a member pivotedly connected to the base structure and rigidly connected to at least the adjacent end link of the associated chain, and resilient means for each such member for applying pressure thereon in a direction urging the associated chain in such opposing direction.

7. A pusher device according to claim 6, wherein said resilient means for at least one of said members comprises a leaf spring.

8. A pusher device according to claim 6, wherein said resilient means for at least one of said members comprises a coiled compression spring.

9. A pusher device according to claim 1, wherein the means for extending or retracting such chains is operative to move the upper chains at a lessor rate than that of the lower chains, whereby said pusher structure tilts rearwardly as it is extended from the base structure.

10. In a pusher device for lift trucks and the like, particularly for sheet-supported loads, the combination of relatively fixed, generally vertically extending base structure provided with means for mounting the same on a lift truck, a platen structure carried by and extending generally horizontally outward from said base structure at the side thereof remote from the mounted side thereof, a pusher structure supported by said platen structure and movable thereon toward and away from the base structure, a plurality of upper and lower pusher chains extending between said base and pusher structure with the adjacent ends of the chains secured to said base structure, which chains are each constructed to be rigid, when extended in substantially a straight line, to compression forces acting thereon along such line, but capable of being flexed in a direction traversed to such line, a sprocket for each chain, rotatably supported by one of said structures, by means of which said chains may be extended from or retracted to the latter, means carried by such structure for guiding the free ends of the chains generally toward one another during retracting movement thereof whereby such free ends may be stored, in substantially a common plane, on the associated structure, a power source carried by said structure, and means operatively connecting said power source and said sprockets for simultaneously rotating the latter in directions to simultaneously extend said chains or retract the same with respect to such structure, and thereby correspondingly move the pusher structure toward or away from the base structure, the means for extending or retracting such chains being operative to move the upper chains at a lessor rate than that of the lower chains, whereby said pusher structure tilts rearwardly as it is extended.

11. In a gripper structure for lift truck pusher devices and the like, the combination of generally horizontal, transversely extending supporting member forming a part of a movable pusher member of such a pusher device, a gripper plate disposed below and extending in the same general direction as said supporting member, said gripper plate being spaced from said supporting member and inclined with respect to the line of direction of such a pusher member whereby its trailing edge is elevated relative to its leading edge, a gripper bar disposed below said member and movable toward and away from said gripper plate, for cooperation therewith to grip sheet material disposed therebetween, a plurality of plate-like members connecting said supporting member and plate, with said plate-like members being disposed in spaced planes extending parallel to the travel direction of said pusher member, whereby said gripper plate and supporting structure therefor does not materially restrict view of the gripper bar and gripper plate from the rear thereof.

12. In a gripper structure for lift truck pusher devices and the like, the combination of a generally horizontal, transversely extending supporting member forming a part of a movable pusher member of such a pusher device having a load-supporting platen, a gripper plate disposed below and extending in the same general direction as said supporting member, said gripper plate being spaced from said supporting member and inclined with respect to the line of direction of such a pusher member whereby its trailing edge is elevated relative to its leading edge, a gripper bar disposed below said member and movable toward and away from said gripper plate, for cooperation therewith to grip sheet material disposed therebetween, means rigidly connecting said supporting member and gripper plate, said plate riding on said platen and supporting such pusher member thereon, the latter having a travel such that a portion of said gripper plate may, at the extreme end of the extension travel of said pusher member, extend beyond the face end of the platen to dispose the leading edge of said gripper plate below the adjacent free end of the platen.

13. A gripper structure according to claim 12, wherein said connecting means comprises a plurality of plate-like members connecting said supporting member and plate, with said plate-like members being disposed in spaced planes extending parallel to the travel direction of said pusher member, whereby said gripper plate and supporting structure therefor does not materially restrict view of the gripper bar and gripper plate from the rear thereof.

14. In a pusher device for lift trucks and the like, particularly for sheet-supported loads, the combination of a relatively fixed, generally vertically extending base structure provided with means for mounting the same on a lift truck, a platen structure carried by and extending generally outward from said base structure at the side thereof remote from the mounted side thereof, a pusher structure supported by said platen structure and movable thereon toward and away from said base structure, a plurality of upper and lower pusher chains extending between said base and pusher structure with the adjacent ends of the chains secured to said base structure, which chains are each constructed to be rigid, when extended in substantially a straight line, to compression forces acting thereon along such line, but capable of being flexed in a direction traversed to such line, a pair of spaced parallel driven shafts rotatably supported by one of said structures, a plurality of sprockets on each shaft by means of which said chains associated therewith may be extended from or retracted to the latter, means carried by such structure for guiding the free ends of the chains generally toward one another during retracting movement thereof whereby such free ends may be stored, in substantially a common plane, on the associated structure, a power source, having a drive shaft, carried by said such structure, and means operatively connecting the drive of said power source and said driven shafts for simultaneously rotating the latter in directions to simultaneously extend said chains or retract the same with respect to such structure, and thereby correspondingly move the pusher structure toward or away from the base structure, said connecting means comprising respective chains, one of which operatively connects cooperable sprockets on said drive shaft and one of said driven shafts, and the other of which operatively connects cooperable sprockets on said drive and other of said driven shafts, and idler means for so guiding said last-mentioned chain relative to its driven sprocket that the two parallel driven shafts rotate in opposite directions.

15. In a pusher device according to claim 1, wherein said means for connecting said power source to said chains comprises a pair of spaced parallel shafts, each of which carries respective of such sprockets for a pair of pusher chains, said power source having a drive shaft, a first chain operatively connecting sprockets and said drive shaft and one of said parallel shafts, a second chain operatively connecting sprockets on said drive shaft and the other of said parallel shafts, and idler means for so guiding said last-mentioned chain relative to its driven sprocket that the two parallel driven shafts rotate in opposite directions.

* * * * *